(12) United States Patent
Suzuki et al.

(10) Patent No.: US 12,486,613 B2
(45) Date of Patent: Dec. 2, 2025

(54) SYNTHETIC RESIN SKIN MATERIAL AND MANUFACTURING METHOD THEREOF

(71) Applicant: KYOWA LEATHER CLOTH CO., LTD., Hamamatsu (JP)

(72) Inventors: Ryutaro Suzuki, Hamamatsu (JP); Masato Yamaoka, Hamamatsu (JP)

(73) Assignee: KYOWA LEATHER CLOTH CO., LTD., Hamamatsu (JP)

( * ) Notice: Subject to any disclaimer, the term of this patent is extended or adjusted under 35 U.S.C. 154(b) by 564 days.

(21) Appl. No.: 17/260,342

(22) PCT Filed: Jan. 9, 2020

(86) PCT No.: PCT/JP2020/000528
§ 371 (c)(1),
(2) Date: Jan. 14, 2021

(87) PCT Pub. No.: WO2020/149215
PCT Pub. Date: Jul. 23, 2020

(65) Prior Publication Data
US 2021/0292965 A1  Sep. 23, 2021

(30) Foreign Application Priority Data
Jan. 16, 2019 (JP) .................. 2019-005477

(51) Int. Cl.
*D06N 3/06* (2006.01)
*B29C 44/24* (2006.01)
(Continued)

(52) U.S. Cl.
CPC .............. *D06N 3/06* (2013.01); *B29C 44/24* (2013.01); *B29C 44/32* (2013.01); *B32B 5/024* (2013.01); *B32B 5/026* (2013.01); *B32B 5/20* (2013.01); *B32B 7/12* (2013.01); *B32B 27/12* (2013.01); *B32B 27/304* (2013.01);
(Continued)

(58) Field of Classification Search
CPC .......... D06N 3/06; D06N 3/065; D06N 3/042; D06N 3/08; D06N 3/128; B32B 27/304; B32B 2307/732
See application file for complete search history.

(56) References Cited

U.S. PATENT DOCUMENTS

2018/0281364 A1* 10/2018 Uemura .................. B32B 27/20
2020/0232157 A1*  7/2020 Min ...................... D06N 3/0077

FOREIGN PATENT DOCUMENTS

CN         106702753 A  *  5/2017
CN         107435248 A     12/2017
(Continued)

OTHER PUBLICATIONS

Machine Translation of JP2015083724 (Year: 2015).*
(Continued)

*Primary Examiner* — Jenna N Chandhok
(74) *Attorney, Agent, or Firm* — Oliff PLC (57) ABSTRACT

A synthetic resin skin material, including a base cloth and a vinyl chloride resin skin layer that is formed on the base cloth and that includes a vinyl chloride resin having a degree of polymerization of 1,600 to 3,000 and includes 3 parts by mass to 20 parts by mass of a silicon-acrylic copolymer with respect to 100 parts by mass of the vinyl chloride resin, and a manufacturing method thereof.

13 Claims, 3 Drawing Sheets

(51) Int. Cl.
  *B29C 44/32* (2006.01)
  *B29K 27/06* (2006.01)
  *B29K 105/04* (2006.01)
  *B32B 5/02* (2006.01)
  *B32B 5/20* (2006.01)
  *B32B 7/12* (2006.01)
  *B32B 27/12* (2006.01)
  *B32B 27/30* (2006.01)
  *D06N 3/00* (2006.01)
  *D06N 3/04* (2006.01)
  *D06N 3/08* (2006.01)
  *D06N 3/12* (2006.01)

(52) U.S. Cl.
  CPC ........... *D06N 3/0043* (2013.01); *D06N 3/005* (2013.01); *D06N 3/042* (2013.01); *D06N 3/065* (2013.01); *D06N 3/08* (2013.01); *D06N 3/128* (2013.01); *B29K 2027/06* (2013.01); *B29K 2105/04* (2013.01); *B32B 2266/0235* (2013.01)

(56) References Cited

FOREIGN PATENT DOCUMENTS

| | | |
|---|---|---|
| JP | 2015-066889 A | 4/2015 |
| JP | 2015-083724 A | 4/2015 |
| WO | 2017/061611 A1 | 4/2017 |

OTHER PUBLICATIONS

Machine Translation of CN106702753 (Year: 2017).*
Apr. 29, 2022 Office Action issued in Chinese Patent Application No. 202080003995.0.

* cited by examiner

SYNTHETIC RESIN SKIN MATERIAL AND MANUFACTURING METHOD THEREOF

TECHNICAL FIELD

The present disclosure relates to a synthetic resin skin material and a manufacturing method thereof.

BACKGROUND ART

In recent years, synthetic resin skin materials having excellent durability are being widely used in place of natural leather and fibrous sheets in automobile interior parts (instrument panels, door trims, seats, ceilings, and the like), railroad vehicle interior parts, aircraft interior parts (trims, seats, ceilings, and the like), furniture, shoes/footwear/bags, interior/exterior parts for construction, clothing surface materials/lining, and wall covering materials. Such synthetic resin skin materials have unevenness similar to that of natural leather on the outermost surface, that is, a grain pattern, and this grain pattern characterizes the appearance.

For example, with regard to automobile interior parts, it has become important to impart a sense of luxury to the skin material for the interior as vehicles becomes more deluxe.

Figure 3:
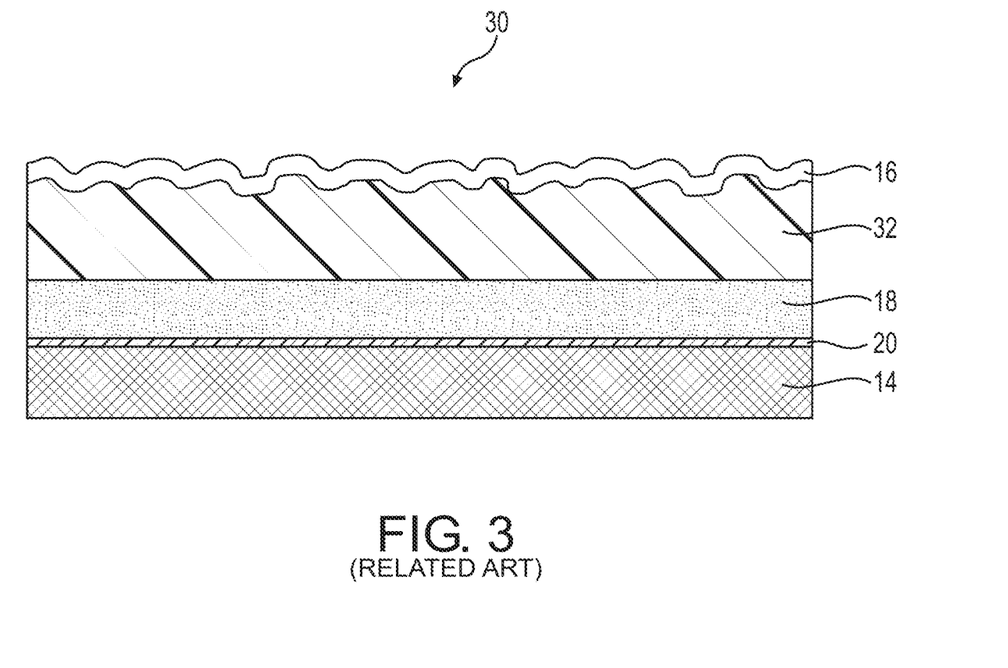
FIG. 3 is a schematic cross-sectional view showing an aspect of a conventional synthetic resin skin material.

FIG. 3 is a schematic cross-sectional view of a conventional synthetic resin skin material 30 having a skin layer 32 including a vinyl chloride resin. In the known synthetic resin skin material 30, a vinyl chloride foam layer, as a foamed resin layer 18, is adhered to the surface of a base cloth 14 via an adhesive layer 20, and the skin layer 32, which includes a vinyl chloride resin, and a surface treatment layer 16 are provided at the surface of the foamed resin layer 18. The foamed resin layer 18 is a layer including air bubbles and having an abundance of elasticity. The surface treatment layer 16 is located on the surface of the skin layer 32, which includes a vinyl chloride resin, and has a function of adjusting appearance and feel and imparting wear resistance to the synthetic resin skin material.

Skin materials for vehicle interiors require a moist feel and soft texture which are not inferior to natural leather. Usually, in order to impart a soft feel, a layer (skin layer) containing a vinyl chloride resin having excellent flexibility and dimensional stability is used in the vicinity of the surface. However, in a case in which a layer containing a vinyl chloride resin having excellent flexibility is disposed in the vicinity of the surface of the skin material, there is a problem that the wear resistance of the surface of the synthetic resin skin material decreases.

Since interior parts for automobiles, skin materials for furniture and the like which are used daily for long periods of time require durability, it is important to be able to maintain a good appearance and texture over a long period of time.

For the purpose of improving wear resistance, measures, such as increasing the thickness of the skin layer containing a vinyl chloride resin existing in the vicinity of the surface, increasing the thickness of the surface treatment layer, and using a high-strength vinyl chloride resin to form the skin layer containing a vinyl chloride resin, can be taken. However, in the above-mentioned measures, there are cases in which the texture of the skin material is impaired, or the flexibility and bendability of the skin material are reduced. Therefore, according to the above-mentioned measures, it is difficult to apply the obtained skin material to a molded body having complicated irregularities as an interior material for an automobile seat or the like.

As a synthetic resin skin material capable of achieving both wear resistance and texture, a synthetic resin skin material including a vinyl chloride resin layer, a water-based cross-linked polyurethane layer, and a surface treatment layer containing a resin and organic particles, in this order, has been proposed (refer to Japanese Patent Application Laid-Open (JP-A) No. 2015-66889).

Further, a synthetic resin leather including a vinyl chloride resin layer containing a specific amount of a silicone-acrylic copolymer with respect to the vinyl chloride and a surface treatment layer that is obtained by cross-linking a mixture of a polycarbonate polyurethane and an ester polyurethane with a cross-linking agent containing a carbodiimide group is proposed (International Publication (WO) No. 2017/061611).

SUMMARY OF INVENTION

Technical Problem

However, although the synthetic resin skin material described in JP-A 2015-66889 has good durability, it includes, on the vinyl chloride resin layer, two layers which are a surface treatment layer for improving the surface feel and a cross-linked polyurethane layer for improving durability, and there is room for improvement in terms of manufacturability.

Further, as described in WO 2017/061611, for the purpose of improving wear resistance, in the case in which the surface of the vinyl chloride resin skin layer is provided with a thick surface treatment layer, or a surface treatment layer and the like that includes a cross-linked structure and improves wear resistance, the soft feel and appearance of the vinyl chloride resin skin layer may be impaired. In particular, when the thickness of the surface treatment layer is increased, a phenomenon called white blur may occur in which the surface of the skin material looks white visually due to light scattering on the surface of the surface treatment layer or the like, and there is a problem that the degree of freedom in design for imparting a good appearance to the synthetic resin skin material is reduced.

An object of an embodiment of the present invention made in consideration of the above-mentioned prior art is to provide a synthetic resin skin material having excellent wear resistance and a good degree of freedom in design.

Further, an object of another embodiment of the present invention is to provide a manufacturing method of a synthetic resin skin material having excellent wear resistance and a good degree of freedom in design.

Solution to Problem

Means for solving the above problems include the following aspects.

(1) A synthetic resin skin material, including: a base cloth; and a vinyl chloride resin skin layer that is formed on the base cloth, and that includes a vinyl chloride resin having a degree of polymerization of 1,600 to 3,000 and includes 3 parts by mass to 20 parts by mass of a silicon-acrylic copolymer with respect to 100 parts by mass of the vinyl chloride resin.

(2) The synthetic resin skin material according to (1), wherein the vinyl chloride resin skin layer does not include, at a surface of an opposite side from a base cloth side, a wear resistance layer including a cross-linked structure.

(3) The synthetic resin skin material according to (1) or (2), further including at least one adhesive layer between the base cloth and the vinyl chloride resin skin layer.
(4) The synthetic resin skin material according to any one of (1) to (3), further including a foamed resin layer between the base cloth and the vinyl chloride resin skin layer.
(5) The synthetic resin skin material according to (1) or (2), further including an adhesive layer and a foamed resin layer, in this order from a base cloth side, between the base cloth and the vinyl chloride resin skin layer.
(6) The synthetic resin skin material according to (4) or (5), wherein the foamed resin layer includes a vinyl chloride resin.
(7) A method of manufacturing a synthetic resin skin material, the method including: a process of forming a vinyl chloride resin skin layer using a composition for forming a vinyl chloride resin skin layer, the composition including a vinyl chloride resin having a degree of polymerization of 1,600 to 3,000 and including 3 parts by mass to 20 parts by mass of a silicon-acrylic copolymer with respect to 100 parts by mass of the vinyl chloride resin; and a process of adhering a base cloth to one surface of the vinyl chloride resin skin layer.
(8) The method of manufacturing a synthetic resin skin material according to (7), the method further including: a process of forming a layer of a composition for forming a foamed resin layer, the composition including a foaming agent and a resin, at a side of the vinyl chloride resin skin layer to which the base cloth is adhered, to form a laminated body of the vinyl chloride resin skin layer and the layer of the composition for forming a foamed resin layer; and a process of causing the foaming agent in the composition for forming a foamed resin layer to foam by heating to form a foamed resin layer.
(9) The method of manufacturing a synthetic resin skin material according to (8), wherein the process of adhering a base cloth includes a process of providing an adhesive layer between the layer of the composition for forming a foamed resin layer and the base cloth.

Although the mechanism of action of the synthetic resin skin material in the present disclosure is not clear, it is considered as follows.

By the synthetic resin skin material in the present disclosure including a vinyl chloride resin having a degree of polymerization of 1,600 to 3,000 as the vinyl chloride resin used for forming the vinyl chloride resin skin layer, the wear resistance of the vinyl chloride resin skin layer when formed into a sheet shape is improved compared to a case in which a vinyl chloride resin having a lower degree of polymerization is included. Further, it is considered that by the vinyl chloride resin skin layer including the silicone-acrylic copolymer, surface energy can be reduced without affecting the hue and the like of the skin layer, and the wear resistance is further improved.

Therefore, the vinyl chloride resin skin layer exhibits durability such as sufficient wear resistance without increasing thickness, and it is possible to provide a synthetic resin skin material that makes the most of the flexibility originally possessed by the vinyl chloride resin.

Further, by the vinyl chloride resin skin layer having good wear resistance, it is not necessary to further provide a surface treatment layer for specifically imparting wear resistance, and by exhibiting an appearance in accordance with the design of the skin layer, degree of freedom in design is good.

As long as the appearance of the synthetic resin skin material is not impaired, it is possible to further include, for example, an optional layer such as a thin surface treatment layer for improving the feel of the surface on the surface of the vinyl chloride resin skin layer.

Although the base cloth used for the synthetic resin skin material in the present disclosure is not particularly limited, by selecting a knitted fabric having good elasticity and stretchability, for example, a knitted fabric such as a stockinette stitch fabric, as the base cloth, there is an advantage in that the stretchability and elasticity of the synthetic resin skin material are further improved.

As described above, since the synthetic resin skin material in the present disclosure has excellent surface wear resistance and durability, and is flexible and has excellent degree of freedom in design, it is suitably used for vehicle interior materials such as vehicle seats and surface material for chairs, and any design can be imparted to a product.

Advantageous Effects of Invention

According to one embodiment of the present invention, it is possible to provide a synthetic resin skin material having excellent wear resistance and a good degree of freedom in design.

Further, according to another embodiment of the present invention, it is possible to provide a manufacturing method of a synthetic resin skin material having excellent wear resistance and a good degree of freedom in design.

DESCRIPTION OF EMBODIMENTS

Hereinafter, preferred embodiments in the present disclosure will be described.

Although explanation of the constituent elements in the embodiments described below may be based on representative embodiments in the present disclosure, the present disclosure is not limited to such embodiments.

In the present disclosure, the expression "(from) . . . to . . . ", which indicates a numerical range, is used to mean that the numerical values before and after the word "to" are included as the lower limit value and the upper limit value.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, the combination of preferred embodiments is a more preferred embodiment.

In the present disclosure, an amount of each component in a composition means the total amount of plural substances present in the composition unless otherwise specified, in a case in which plural substances corresponding to each component are present in the composition.

In the present disclosure, the term "process" does not only mean an independent process, but also includes processes that cannot be clearly distinguished from other processes as long as the intended purpose of the process is achieved.

The expression "good degree of freedom in design" in the present disclosure indicates that "a phenomenon referred to as white blur, which is caused by light scattering on the surface of a synthetic resin skin material or the like, is suppressed". That is, when the surface of the skin material looks white due to light scattering or the like, it becomes difficult to see the hue originally possessed by the skin material, the grain pattern simulating natural leather, or the like, and a design giving a good appearance is impaired. However, according to the synthetic resin skin material in the present disclosure, a decrease in the degree of freedom of the design caused by white blur is suppressed, and a degree of freedom in design that imparts a good appearance is achieved.

Synthetic Resin Skin Material

First, the synthetic resin skin material in the present disclosure will be described with reference to FIG. 1 and FIG. 2.

Figure 1:
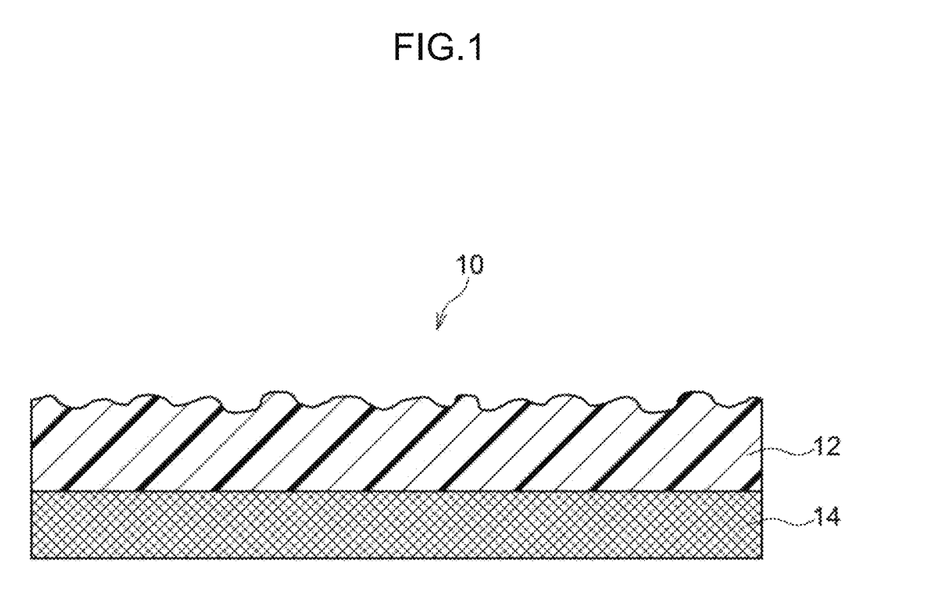
FIG. 1 is a schematic cross-sectional view showing an aspect of the synthetic resin skin material in the present disclosure.

FIG. 1 is a schematic cross-sectional view showing an embodiment of the layer structure of the synthetic resin skin material 10 according to the present disclosure. The embodiment shown in FIG. 1 shows the simplest configuration of the synthetic resin skin material in the present disclosure.

In the embodiment shown in FIG. 1, the synthetic resin skin material 10 has a vinyl chloride resin skin layer 12 on a base cloth 14.

The constituent elements shown using the same reference numerals in each drawing mean that they are the same constituent elements.

The vinyl chloride resin skin layer (hereinafter, also referred to as "skin layer") in the synthetic resin skin material in the present disclosure includes a vinyl chloride resin having a degree of polymerization of 1,600 to 3,000 (hereinafter, also referred to as "specific vinyl chloride resin"), and includes 3 parts by mass to 20 parts by mass of a silicone-acrylic copolymer with respect to 100 parts by mass of the specific vinyl chloride resin. Due to this composition, the vinyl chloride resin skin layer has flexibility and good feel particular to vinyl chloride resin, and is excellent in wear resistance. Therefore, in particular, it is not necessary to further provide a different layer on the surface of the vinyl chloride resin skin layer which is opposite to the base cloth for the purpose of improving wear resistance.

Therefore, the synthetic resin skin material has the feel of the vinyl chloride resin and a good appearance, and has an appearance that makes the best use of various designs imparted at the time of forming the vinyl chloride resin skin layer. Therefore, the synthetic resin skin material in the present disclosure has a good degree of freedom in design.

The synthetic resin skin material in the present disclosure is not particularly limited as long as it includes a base cloth and a vinyl chloride resin skin layer described in detail below. In addition to the base cloth and the vinyl chloride resin skin layer, other layers that are usually provided in synthetic resin skin materials may be included as long as the effect is not impaired. Other layers will be described hereafter.

Hereinafter, the synthetic resin skin material in the present disclosure (which may be simply referred to as "skin material" hereinafter) will be sequentially described together with the materials constituting the synthetic resin skin material and the manufacturing method thereof.

1. Base Cloth

The base cloth of the skin material in the present disclosure is not particularly limited as long as it has the necessary strength and durability, and can be appropriately selected from known base cloths, according to the purpose, and used. The base cloth may be any of a knitted fabric, a woven fabric, or a non-woven fabric.

In a case in which the skin material is applied to a molded body having irregularities, it is preferable to use a knitted fabric or a woven fabric having a certain degree of stretchability. From the viewpoint of better feel and shape followability of the skin material, it is preferable to use a base cloth having a uniform vertical and horizontal elongation ratio and a relatively thick thickness.

As the base cloth, for example, in the case of use as a skin material for a vehicle seat, a knitted fabric such as a stockinette stitch fabric or a modified stockinette stitch fabric is preferable from the viewpoint of stretchability and ease of controlling thickness.

Further, as the base cloth, a three-dimensional non-woven fabric or the like is also preferably used from the viewpoint of easy adjustment of thickness.

Examples of the material of the fiber (yarn) used for knitting and weaving the base cloth include yarn made of polyester, polyamide, rayon and the like, and blended yarn containing polyester, polyamide, rayon and the like.

As the base cloth, in addition to stockinette stitch fabric, for example, a base cloth for synthetic leather using a ponte fabric described in Japanese Patent Application Laid-Open (JP-A) No. 2013-72141 can also be used.

The thickness of the base cloth is appropriately selected in accordance with the intended use of the skin material. Above all, a range that is excellent in feel and does not reduce the flexibility of the skin material, for example, a range of 0.15 mm to 0.6 mm is preferable, and a range of 0.3 mm to 0.5 mm is more preferable.

If necessary, raising processing may be performed on the surface of the skin layer side of the base cloth. Further, as the base cloth, a pile stitch fabric in which a pile is formed on the surface of the skin layer side of the base cloth may be used. By having nap or pile on the surface of the base cloth, the adhesiveness with an adjacent layer such as a skin layer, an adhesive layer or the like is further improved.

2. Vinyl Chloride Resin Skin Layer

The skin layer in the skin material in the present disclosure includes the specific vinyl chloride resin having a degree of polymerization of 1,600 to 3,000 and includes 3 parts by mass to 20 parts by mass of a silicone-acrylic copolymer with respect to 100 parts by mass of the specific vinyl chloride resin, and may include other components if desired.

The skin layer is formed using a composition for forming a vinyl chloride resin skin layer including at least the specific vinyl chloride resin, a silicone-acrylic copolymer, and preferably a plasticizer.

2-1. Vinyl Chloride Resin having a Degree of Polymerization of 1,600 to 3,000

The specific vinyl chloride resin is a resin obtained by addition polymerization of a vinyl chloride monomer ($CH_2$=CHCl). As the vinyl chloride resin, a resin having a degree of polymerization of about 1,000 to 1,300 is widely used. However, by the skin layer in the skin material in the present disclosure using the specific vinyl chloride resin having a degree of polymerization of 1,600 to 3,000, and further including a silicone-acrylic copolymer described hereafter, strength and wear resistance are improved.

The degree of polymerization of the specific vinyl chloride resin is 1,600 to 3,000, preferably 1,700 to 2,900, and more preferably 1,700 to 2,800.

For the degree of polymerization of the vinyl chloride resin in the present disclosure, the catalog value can be referred to in the case of a commercial product.

As the specific vinyl chloride resin included in the skin layer, any vinyl chloride resin can be used as long as the degree of polymerization is within the above range.

A commercial available product may be used as the specific vinyl chloride resin, and examples thereof include TH-2800 manufactured by Taiyo Vinyl Corporation, and the like.

The skin layer may include only one specific vinyl chloride resin, or may include two or more specific vinyl chloride resins. In a case in which two or more specific vinyl chloride resins are included, a mixture of two or more vinyl chloride resins having different degrees of polymerization may be used as long as the degree of polymerization is within the aforementioned ranges of degree of polymerization.

The skin layer may include other resins in addition to the vinyl chloride resin. The content of the vinyl chloride resin with respect to all of the resin contained in the skin layer is preferably 30 mass % to 80 mass %, and more preferably 40 mass % to 50 mass %.

In order to improve the flexibility of the obtained skin layer, it is preferable for the skin layer to include a plasticizer.

2-2. Silicone-Acrylic Copolymer

The skin layer includes at least one silicone-acrylic copolymer.

The silicone-acrylic copolymer is a copolymer including the following siloxane structural unit and a structural unit derived from an acrylic monomer.

Formula 1

The silicone-acrylic copolymer can be obtained, for example, by copolymerizing a polyorganosiloxane having a radically polymerizable group at the terminal with a (meth) acrylic acid ester by a conventional method. The copolymerization ratio of the siloxane structural unit and the structural unit derived from the acrylic monomer is not particularly limited, and the copolymerization ratio of the siloxane structural unit:the structural unit derived from the acrylic monomer can be made to be 60:40 to 90:10 in molar ratio. Above all, from the viewpoint of further improving the wear resistance of the formed skin layer, the copolymerization ratio of the siloxane structural unit:the structural unit derived from the acrylic monomer is preferably 65:35 to 75:25, and more preferably 70:30 to 75:25.

The skin layer may include only one silicone-acrylic copolymer, or may include two or more silicone-acrylic copolymers.

The content of the silicone-acrylic copolymer in the skin layer is, with respect to 100 parts by mass of the vinyl chloride resin included in the skin layer, 3 parts by mass to 20 parts by mass, preferably in the range of 5 parts by mass to 15 parts by mass, and more preferably in the range of 7 parts by mass to 13 parts by mass.

When the content of the silicone-acrylic copolymer is in the above range, the surface wear resistance and flexibility of the skin material are in the preferable range.

2-3. Other Components Included in the Skin Layer

The skin layer may include another component in addition to the specific vinyl chloride resin and the silicone-acrylic copolymer.

Examples of another component include a synthetic resin other than the above, a plasticizer, a stabilizer, a filler, a colorant, a flame retardant, a gelation accelerator, a plasticizer phase solvent, and the like.

Plasticizer

In order to improve the flexibility of the vinyl chloride resin, it is preferable that the skin layer includes a plasticizer.

As the plasticizer, a known plasticizer for vinyl chloride resin can be used without limitation.

Examples of the plasticizer include a phthalate ester-based plasticizer such as diisodecyl phthalate, di-2-ethylhexyl phthalate, or diisononyl phthalate; a fatty acid ester-based plasticizer such as dioctyl adipate or dioctyl sebacate; a trimellitic acid-ester plasticizer such as trioctyl trimellitate; a triaryl phosphate-based plasticizer such as tricresyl phosphate or trixylyl phosphate; an epoxy-based plasticizer such as epoxidized soybean oil; a polyester-based plasticizer such as polypropylene adipate, and the like.

The skin layer may include only one plasticizer, or may include two or more plasticizers.

Colorant

The skin layer may include a colorant. By the skin layer including a colorant, a desired hue can be imparted to the skin material, and a skin material that is excellent in design can be obtained.

In a case in which the skin layer includes a colorant, the colorant is not particularly limited, and dyes, pigments and the like can be appropriately selected and used. From the viewpoint of being better in durability and light resistance, the colorant is preferably a pigment.

Examples of the colorant include an inorganic pigment such as titanium white (titanium dioxide), zinc oxide, ultramarine blue, cobalt blue, red iron oxide, vermilion, chrome yellow, titan yellow, or carbon black; an organic pigment or dye such as quinacridone, permanent red 4R, isoindolinone, Hansa yellow A, phthalocyanine blue, indanthrene blue RS, or aniline black; a metallic pigment selected from the group consisting of metallic foil powders such as aluminum or brass; and a pearlescent pigment selected from the group consisting of foil powders of titanium dioxide-coated mica or basic lead carbonate.

The skin layer may include only one colorant, or may include two or more colorants.

In a case in which a pigment is used as the colorant, a pigment dispersant such as a surfactant or a polymer dispersant may be used in combination.

Other Components

The skin layer may contain a filler. Examples of the filler include an inorganic filler such as calcium carbonate, silica (silicon dioxide), alumina (aluminum oxide), mica, talc, or barium sulfate.

The skin layer may include only one filler, or may include two or more fillers.

The skin layer may contain a stabilizer. By containing a stabilizer, the heat resistance of the skin layer is improved.

Examples of the stabilizer include: a fatty acid metal salt such as magnesium stearate, aluminum stearate, calcium stearate, barium stearate, zinc stearate, calcium laurate, barium laurate, or zinc laurate; a sodium compound such as of phenol or naphthol; a metallic salt such as of zinc or barium; an organotin compound such as dibutyltin dilaurate or dibutyltin dimalate; and a phosphite ester such as diethyl phosphite, dibutyl phosphite, dioctyl phosphite, diphenyl isodecylphosphite, tricresyl phosphite, triphenyl phosphite, tris (nonyl phenyl) phosphite or triisooctyl phosphite. The skin layer may include only one stabilizer, or may include two or more stabilizers.

The skin layer may contain a flame retardant. By the skin layer including a flame retardant, the skin material can be imparted with flame retardance. As the flame retardant, a known inorganic or organic flame retardant can be appropriately selected and used. The skin layer may include only one flame retardant, or may include two or more flame retardants.

The skin layer may include another synthetic resin in addition to a vinyl chloride resin and a silicone-acrylic copolymer for the purpose of improving membrane properties and the like. Examples of another synthetic resin include a thermoplastic polyurethane resin (TPU). In a case in which another resin is included, the content of another resin is preferably 10 parts by mass or less with respect to 100 parts by mass of the total solid content of the skin layer.

2. Formation of Skin Layer

There is no particular limitation to the method of forming the skin layer. A method for forming the skin layer includes a method of forming the skin layer by preparing a composition for forming a skin layer which contains each of the above-mentioned components and forming the skin layer into a sheet by a calender method, a paste processing method, a melt extrusion method, or the like. Further, a method may be employed in which the composition for forming a skin layer is applied directly on the base cloth or via an adhesive layer or the like to be described hereinafter to form a layer of the composition for forming a skin layer, which is cured to form the skin layer on the base cloth.

Above all, it is preferable to form the skin layer by the calender method from the standpoint of the uniformity of the skin layer becoming better and the inside of the apparatus after forming the skin layer containing the colorant being easy to clean.

Although the thickness of the skin layer is not particularly limited, since the skin layer in the present disclosure has good wear resistance and strength even if it is a thin layer, it is not always necessary to increase the thickness in order to improve the strength.

The thickness of the skin layer is preferably in the range of 170 μm to 650 μm, and more preferably in the range of 200 μm to 300 μm.

The skin material in the present disclosure may be composed of only the base cloth and the skin layer, but may include other known layers.

Figure 2:
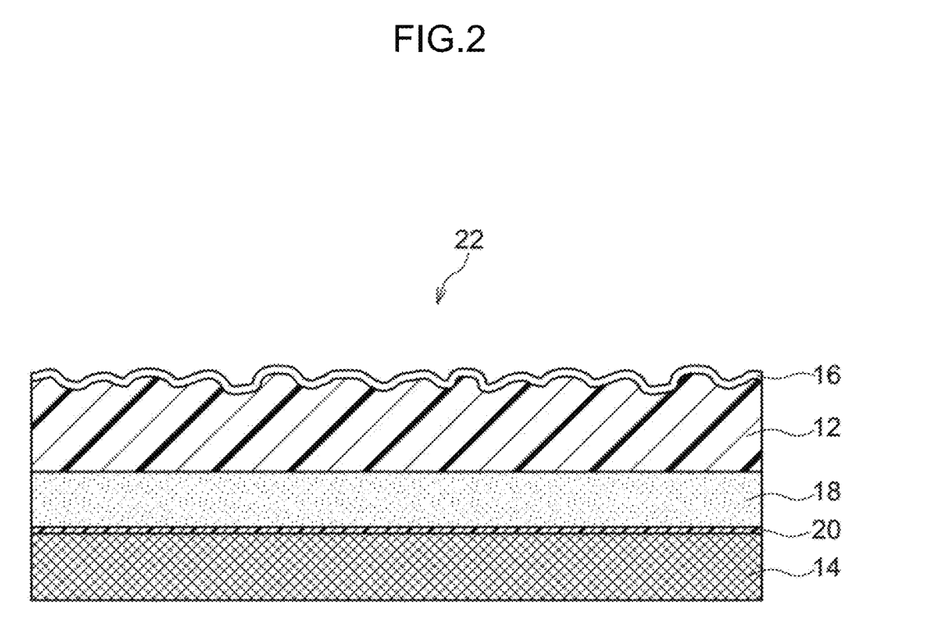
FIG. 2 is a schematic cross-sectional view showing an aspect of the synthetic resin skin material in the present disclosure having, in addition to a vinyl chloride resin skin layer, optional layers such as a surface treatment layer and a foamed resin layer.

FIG. 2 is a schematic cross-sectional view showing another example of the skin material in the present disclosure.

The skin material 22 shown in FIG. 2 includes, via an adhesive layer 20, which is an optional layer, a foamed resin layer 18, which is an optional layer, the above-mentioned skin layer 12, and a surface treatment layer 16, which is an optional layer, on the base cloth 14 in this order.

By the skin material 22 including the adhesive layer 20, adjacent layers are more stably and firmly adhered to each other via the adhesive layer 20.

Further, by the skin material 22 including the foamed resin layer 18, the skin material 22 becomes more flexible, and an appropriate elasticity can be imparted to the skin material 22.

By the skin material 22 including the surface treatment layer 16, an arbitrary good feel can be imparted to the skin material 22. Since the skin layer 12 in the present disclosure has good wear resistance, a thick surface treatment layer having a cross-linked structure or the like, like the known surface treatment layer 16, or a wear resistant layer having a cross-linked structure or the like, for the purpose of improving strength such as wear resistance, is not necessary.

Hereinafter, optional layers that the skin material in the present disclosure may include will be described.

3. Adhesive Layer

The skin material in the present disclosure may include an adhesive layer. The adhesive layer is provided for the purpose of, for example, improving the adhesiveness between adjacent layers such as the base cloth and the skin layer.

The adhesive layer can be formed by, for example, laminating an adhesive on the surface of the base cloth and drying it. Lamination of the adhesive may be carried out by a transfer method or a coating method.

Although the adhesive used for forming the adhesive layer provided as desired is not particularly limited and may be appropriately selected in accordance with the purpose, for example, (1) a urethane emulsion adhesive, (2) a vinyl chloride adhesive, (3) a two-component polyester adhesive, and (4) a two-component urethane adhesive are preferably used.

When forming a laminated body of a base cloth and a skin layer to form a skin material, usually, an adhesive layer can be formed by applying an adhesive to the surface of the base cloth.

Further, in the embodiment shown in FIG. 2, the adhesive layer 20 and the foamed resin layer 18, which are optional layers, are formed between the base cloth 14 and the skin layer 12. In this case, first, a layer of a composition for forming a skin layer for forming the skin layer 12 may be formed, a layer of a composition for forming a foamed resin layer, which will be described hereafter, may be formed on the surface of the layer of the composition for forming a skin layer, and then an adhesive may be applied to the layer of the composition for forming a foamed layer to form the adhesive layer 20.

The skin material may include only one adhesive layer, or may include two or more layers if necessary.

As described above, any known method such as a transfer method or a coating method can be used as the method for applying the adhesive, but from the viewpoint that an adhesive layer having a uniform thickness can be easily formed, it is preferable to use a transfer method.

Further, in a case in which the adhesive layer is formed by a transfer method, a protective sheet may be provided on the surface of the adhesive layer in order to protect the surface of the adhesive layer prepared in advance. As the protective sheet on the surface of the adhesive layer, a resin film, releasing paper, resin-laminated paper, or the like can be appropriately used.

4. Foamed Resin Layer

The skin material in the present disclosure may include a foamed resin layer.

The foamed resin layer is provided for the purpose of imparting elasticity to the skin material and further improving feel. Examples of the resin contained in the foamed resin layer include, from the viewpoint of easy foaming, a vinyl chloride resin and a urethane resin, and from the viewpoint of excellent affinity with the skin layer, it is preferable that the foamed resin layer contains a vinyl chloride resin.

The foamed resin layer is formed by forming a layer of a composition for forming a foamed resin layer, the composition containing a foaming agent and a resin, and then causing the foaming agent to foam by heating to generate fine air bubbles in the resin layer. By the above method, a foamed resin layer containing fine air bubbles is formed.

In a case in which the foamed resin layer includes a vinyl chloride resin, examples of the vinyl chloride resin contained in the skin layer described above can be similarly given as the vinyl chloride resin. The vinyl chloride resin included in the foamed resin layer may be the same as or different from the vinyl chloride resin contained in the skin layer.

The foaming agent is not particularly limited as long as it can form fine air bubbles that give the foamed resin layer the necessary elasticity and thickness. Examples of the foaming agent include chemical foaming agents such as azodicarbonamide (ADCA) and p,p'-oxybisbenzenesulfonyl hydrazide (OBSH), which foam by heating, thermal expansion beads and the like.

The thermal expansion beads used for preparing the composition for forming a foamed resin layer are particles formed by encapsulating an organic solvent such as a hydrocarbon solvent in hollow thermoplastic resin particles, the volume of the particles increasing due to volume expansion of the organic solvent by heating, and as a result, a foamed resin layer in which air bubbles are contained in the resin matrix (dispersion medium) is formed.

As the thermal expansion beads used in the present disclosure, any thermal expansion beads may be used as long as they expand by heating to form air bubbles in the resin matrix and the state of the formed air bubbles can be maintained.

Thermal expansion beads are also available as commercial products, and examples thereof include the Expancel series (trade name) manufactured by Japan Fillite Co., Ltd., all of which can be used in the present disclosure.

In a case in which thermal expansion beads are used as the foaming agent, as the amount of the thermal expansion beads to be added with respect to 100 parts by mass of resin included in the foamed resin layer, 0.5 parts by mass to 10 parts by mass is preferable, and 1 part by mass to 7 parts by mass is more preferable.

In the composition for forming a foamed resin layer in the present disclosure, it is preferable to use an organic solvent instead of water as the solvent from the viewpoint of efficiently carrying out drying. In a case in which thermal expansion beads are used as the foaming agent, it is preferable to select an organic solvent that does not dissolve the resin constituting the thermal expansion beads. This is because in a case in which the resin constituting the thermal expansion beads is dissolved by the organic solvent, the hollow portion cannot be maintained and it becomes difficult to form a foamed resin layer containing the desired air bubbles.

Methods for selecting a solvent that does not dissolve the resin constituting the thermal expansion beads include a method in which the thermal expansion beads to be used are immersed in the organic solvent to be evaluated (including simple substances and a mixture) at room temperature (25° C.) for 3 days, and then an organic solvent having no evidence of foaming by visually determination is selected. In a case in which the resin constituting the thermal expansion beads is dissolved in an organic solvent, the outer skin of the resin beads is damaged, and the gas contained in the thermal expansion beads or the hydrocarbon solvent flows out into the organic solvent in which the thermal expansion beads are immersed and air bubbles are observed. Such an organic solvent is not included in the "solvent that does not dissolve the resin constituting the thermal expansion beads" in the present disclosure.

For example, in a case in which Expancel manufactured by Japan Fillite Co., Ltd. is used as the thermal expansion beads, examples of the solvent that can be used include methyl alcohol, ethyl alcohol, isopropyl alcohol (IPA), toluene, styrene, acetone, ethyl acetate, and ethylene glycol, n-hexane, cyclohexane, methyl ethyl ketone (MEK), and propylene glycol monomethyl ether (PGME), and one or more of these solvents may be appropriately selected and used.

The heating temperature for expanding the thermal expansion beads contained in the layer of the composition for forming a foamed resin layer is preferably in the range of 130° C. to 230° C., and more preferably in the range of 190° C. to 230° C.

The film thickness of the foamed resin layer is not particularly limited and may be appropriately selected in accordance with purpose. Generally, from the viewpoint of strength and tactile sensation, the film thickness of the foamed resin layer is preferably in the range of 150 μm to 700 μm, and more preferably in the range of 170 μm to 450 μm, as the film thickness before foaming. Further, the film thickness of the foamed resin layer containing air bubbles after foaming is preferably in the range of 220 μm to 1,300 μm, and more preferably in the range of 400 μm to 900 μm.

As shown in FIG. 2, including the adhesive layer 20 between the base cloth 14 and the foamed resin layer 18 in the synthetic resin skin material 22 is preferable from the viewpoint of further improving the durability and shape followability of the skin material 22.

5. Surface Treatment Layer

As described above, the skin material may include a surface treatment layer for the purpose of improving appearance and feel.

The surface treatment layer is provided for the purpose of further improving feel, and includes at least a resin, and if desired, may include, as a feel improver, organic particles which are a filler, a colorant for the purpose of improving the design, and the like.

Further, the surface treatment layer that is located at the outermost surface of the skin material and formed as desired may be colored or printed in accordance with purpose, or may be formed with natural leather-like irregularities typified by a grain pattern.

Examples of the resin that can be contained in the surface treatment layer include polyurethane, acrylic resin, fluororesin, and vinyl chloride resin, and from the viewpoint of good feel, it is preferable to use polyurethane as the main material. Here, the "main material" means a resin having the highest content ratio when plural resins are used in combination.

As the polyurethane used for the surface treatment layer, a water-based polyurethane is preferable.

Further, examples of the acrylic resin used for the surface treatment layer include a polymer or copolymer of methacrylic acid or methacrylic acid ester represented by polymethylmethacrylate (PMMA), and a copolymer of alkyl methacrylate, alkyl acrylate and styrene.

By including organic particles as a filler in the surface treatment layer, a moist and warm tactile sensation can be imparted to the skin material as compared with a case in which an amorphous inorganic filler, which has been conventionally used as a matting agent, is used.

Examples of the organic particles include organic resin particles such as urethane beads and acrylic beads, and a protein-based filler such as collagen particles.

The shape of the organic particles is preferably a spherical shape or a spherical shape close to a true spherical shape from the viewpoint of improving feel. It is preferable for the shape of organic particles to be, for example, one in which the ratio of the major diameter to the minor diameter is 1.5 or less.

The average particle size of the organic particles is preferably in the range of 1 µm to 20 µm, and more preferably in the range of 5 µm to 10 µm. When the particle size is in the above range, the drop off of particles from the surface treatment layer and an adverse effect on appearance are suppressed, and a good appearance and an excellent texture can be maintained for a long period of time.

As the average particle size of the organic particles, the value measured by the method of measuring the volume-based median diameter is used, the median diameter being determined by using an automatic particle size measuring device (model number: CAPA-300) manufactured by Horiba, Ltd., and using a light transmission centrifugal precipitation method at a disk rotation speed of 3,000 rpm (rotation/minute) using water as the dispersion medium.

The surface treatment layer may include only one type of organic particles, or may contain two or more types of organic particles.

The surface treatment layer may include a colorant to impart design as necessary. As the colorant, the general-purpose colorants mentioned regarding the skin layer can be used in the same manner, and the preferable content is also the same.

The thickness of the surface treatment layer is preferably in the range of 1 µm to 5 µm, and more preferably in the range of 2 µm to 3 µm.

Since the skin material in the present disclosure has a skin layer including the specific vinyl chloride resin and a specific amount of silicone-acrylic copolymer, at the surface of the skin layer opposite to the base cloth side, that is, the outermost surface of the skin material, good wear resistance can be obtained even if the outermost surface of the skin material does not have an wear resistant layer including a cross-linked structure.

Manufacturing Method of Synthetic Resin Skin Material

The method for manufacturing the synthetic resin skin material in the present disclosure is not particularly limited. The synthetic resin skin material in the present disclosure is preferably manufactured by the method for manufacturing the synthetic resin skin material in the present disclosure (hereinafter, may be referred to as the manufacturing method in the present disclosure) indicated below.

The manufacturing method in the present disclosure includes a process (process (I)) of forming a vinyl chloride resin skin layer using a composition for forming a vinyl chloride resin skin layer, the composition including a vinyl chloride resin having a degree of polymerization of 1,600 to 3,000 (the specific vinyl chloride resin), and including a silicone-acrylic copolymer having 3 parts by mass to 20 parts by mass with respect to 100 parts by mass of the specific vinyl chloride resin, and a process (process (II)) of adhering a base cloth to one side of the vinyl chloride resin skin layer.

Further, in the manufacturing method in the present disclosure, in addition to process (I) and process (II), if desired, a process (process (III)) of forming a layer of a composition for forming a foamed resin layer including a foaming agent and a resin at the side of the vinyl chloride resin skin layer to which the base cloth is to be adhered, to form a laminated body of the vinyl chloride resin skin layer and a layer of the composition for forming a foamed resin layer, and a process (process (IV)) of, by heating, causing the foaming agent included in the composition for forming a foamed resin layer to form a foamed resin layer, may be included.

The process (process (II)) of adhering the base cloth to one side of the vinyl chloride resin skin layer may include a process (process (V)) of providing an adhesive layer between the layer of the composition for forming a foamed resin layer and the base cloth.

Further, in a case in which the surface treatment layer, which is an optional layer, is provided, a process (process (VI)) of forming the surface treatment layer on the surface of the skin layer opposite to the base cloth side may be performed.

The manufacturing method in the present disclosure will be described in detail for each process.

Process (I)

Process (I) is a process of using a composition for forming a vinyl chloride resin skin layer including the specific vinyl chloride resin having a degree of polymerization of 1,600 to 3,000 and including a silicone-acrylic copolymer of 3 parts by mass to 20 parts by mass with respect to 100 parts by mass of the specific vinyl chloride resin to form a skin layer, wherein the composition for forming the vinyl chloride resin skin layer containing the specific vinyl chloride resin having a degree of polymerization of 1,600 to 3,000, the silicone-acrylic copolymer of 3 parts by mass to 20 parts by mass with respect to 100 parts by mass of the specific vinyl chloride resin, and an optional component such as a plasticizer or a colorant to be contained as desired is first prepared, and the obtained composition is used to form the skin layer.

Any method for forming the skin layer can be employed, and examples thereof include, as described above, a method in which the prepared composition for forming a vinyl chloride resin skin layer is formed into a sheet shape by a calender method, a paste processing method, a melt extrusion method, or the like to form the skin layer, and a method in which the composition is formed into a sheet shape by a calender method to form a skin layer is preferable.

Process (III)

In a case of forming the foamed resin layer, which is an optional layer, the process (process (III)) of, further to the process of forming the skin layer, forming a layer of a composition for forming a foamed resin layer constituted from a composition containing a foaming agent and a resin, to form a laminated body of the skin layer and the layer of the composition for forming a foamed resin layer, may be performed.

In the case of performing process (III), the laminated body may be formed by simultaneous calendering of or simultaneous extrusion of the skin layer and the layer of the composition for forming a foamed resin layer.

Further, a method may be employed in which, first, a layer of the composition for forming a foamed resin layer is formed, and a skin layer (or a layer of a composition for forming a skin layer) is formed on the surface thereof by a paste processing machine or an extrusion machine to form a laminated body of the layer of the composition for forming a foamed resin layer and the skin layer.

Process (II)

Process (II) is a process in which the skin layer preformed in process (I) or the laminated body of the skin layer and the layer of the composition for forming a foamed resin layer, which are formed by performing process (I) and process (III), are adhered to the base cloth. In place of process (II), or in addition to process (II), a process (process (V)) of providing an adhesive layer between the layer of the composition for forming a foamed resin layer and the base cloth may be performed.

In a case in which the laminated body and the base cloth are adhered (process (V)), the base cloth may be adhered to the surface of the layer of the composition for forming a foamed resin layer side of the laminated body.

As the base cloth, a base cloth that has undergone raising processing by a conventional method may be used at the side in contact with the skin layer or the layer of the composition for forming a foamed resin layer.

Adhesion may be performed by forming an adhesive layer on the surface of the skin layer or the layer of the composition for forming a foamed resin layer, or on the surface of the base cloth, and then bonding the two via the adhesive layer.

Further, in a case in which the laminated body and the base cloth are adhered, for example, the laminated body may be laminated together with the base cloth before curing of the layer of the composition for forming a foamed resin layer, after which the adhesive layer and the foamed resin layer may be cured and adhered.

The adhesive layer can be formed, for example, by laminating an adhesive on the surface of the skin layer or the layer of the composition for forming a foamed resin layer, or on the surface of the base cloth, and drying it.

The adhesive used to form the adhesive layer provided as desired is as described in the section on the adhesive layer.

Usually, the adhesive layer is formed by applying an adhesive to the layer forming the adhesive layer or the surface of the base cloth. Examples of the method for applying the adhesive include a transfer method and a coating method, and it is preferable to use a transfer method from the viewpoint that an adhesive layer having a uniform thickness can be easily formed.

Process (I) or process (III), and process (II) or process (V), may be performed simultaneously or sequentially. That is, while the skin layer or the laminated body is formed by a calender method or the like and conveyed, the base cloth may be adhered while it is heated and pressed on the surface of the skin layer or the laminated body on the side of the layer of the composition for forming a foamed resin layer by a nip roller or the like.

Further, in the case of adhering the base cloth and the desired layer via the adhesive layer, an adhesive layer may be formed on the surface of the desired layer, after which the adhesive layer and the base cloth may be pressure-bonded together.

By heating and drying the adhesive layer, a desired layer and an adhesive layer are formed on the skin layer.

Process (VI)

Process (VI) is a process in which, in order to make the feel and appearance of the surface of the skin layer excellent, a surface treatment layer (feel improvement layer) is formed on the surface of the skin layer (the surface on the side opposite to the base cloth side of the skin layer).

Process (VI) is performed by applying a composition for forming a surface treatment layer containing a resin to the surface of the skin layer.

The composition for forming a surface treatment layer can be applied by appropriately performing a known method.

The surface treatment layer is formed by appropriately selecting and performing from methods such as coating by a gravure printing method and coating by a coating device such as a reverse coater or a direct coater, to apply the composition for forming a surface treatment layer on the surface of the skin layer. Above all, from the viewpoint that a more uniform layer can be formed, it is preferable to apply the composition for forming a surface treatment layer by a gravure printing method.

The details of the surface treatment layer are as described above. In the manufacturing method in the present disclosure, since the thickness of the surface treatment layer can be reduced even in a case in which the surface treatment layer is formed, a surface treatment layer for improving feel has almost no effect on the appearance of the skin layer, and therefore, it is possible to suppress decrease in the degree of freedom in design of the skin layer.

Process (IV)

In a case in which the skin material obtained by the manufacturing method in the present disclosure has a foamed resin layer, that is, in a case in which process (III) of forming a laminated body of the skin layer and the layer of the composition for forming a foamed resin layer is performed, after process (III), the foaming agent in the composition for forming a foamed resin layer is foamed by heating to form the foamed resin layer (process (IV)).

Process (IV) is a process of forming a foamed resin layer by foaming the foaming agent contained in the composition for forming a foamed resin layer by heating. The heating is preferably performed by non-contact heating by conveying the laminated body in a heating furnace adjusted to a predetermined temperature.

In a case in which the layer of the composition for forming a foamed resin layer includes thermal expansion beads as the foaming agent, the heating temperature for expanding the thermal expansion beads is preferably in the range of 130° C. to 230° C., and more preferably in the range of 190° C. to 230° C. Further, in a case in which ADCA is used as the foaming agent, the heating temperature is preferably in the range of 180° C. to 250° C., and more preferably in the range of 200° C. to 230° C.

The process (IV) may be performed after the process of adhering the base cloth and the skin layer (process (II)) and prior to the process of forming the surface treatment layer (process (VI)) or after process (VI).

Other Processes

In the manufacturing method in the present disclosure, if necessary, a process of imparting a design property for further improving appearance can be performed.

After completing the process (I) and process (II), or in addition to process (I) and process (II), and after completing other process previously described as desired, a process for imparting a design property can be performed.

A process of imparting a design property includes, for example, a process in which a grain pattern is formed on a surface of the skin layer or a surface treatment layer provided as desired, for example, by pressing an embossing roller having a grain pattern, which is a leather-like fine uneven pattern, engraved therein, with the surface thereof being heated.

Application of the grain pattern may be performed after the process (II) and prior to the process (VI). In this case, the application of the grain pattern may be a process in which the foaming agent is foamed by heating the laminated body including the layer of the composition for forming a foamed resin layer and the skin layer on the base cloth to form the foamed resin layer having air bubbles, after which the embossing roller engraved with the shape of the grain pattern is pressed thereon with the surface of the embossing roller being heated, to form a grain pattern, after which a surface treatment layer is formed if desired.

By forming natural leather-like irregularities on a grain-pattern roller in advance and embossing processing using this, natural leather-like irregularities are transferred to the surface, and the synthetic resin skin material has an excellent appearance like natural leather.

The heating temperature in the embossing processing is preferably 100° C. to 240° C. The heating temperature is a value obtained by measuring the surface temperature of the embossing roller used for the embossing processing.

The skin material in the present disclosure obtained by the manufacturing method in the present disclosure includes, on the outermost surface, a skin layer having good wear resistance and good flexibility or a surface treatment layer having good feel, and therefore, is suitably used for a skin material of a molded body having a complicated shape, for applications having excellent durability such as wear resistance.

The synthetic resin skin material in the present disclosure is formed by a simple method represented by the manufacturing method in the present disclosure described above, and has excellent appearance and durability, and is flexible. Therefore, the synthetic resin skin material in the present disclosure is suitable to be used for various fields such as interior materials for automobiles, interior parts for railroad vehicles/aircrafts, furniture, shoes/footwear/bags, interior/exterior parts for construction, and clothing surface materials/lining.

EXAMPLES

Hereinafter, although the present invention will be specifically described with reference to examples, the present invention is not limited thereto.

Example 1

As the resin included in the composition for forming a vinyl chloride resin skin layer, polyvinyl chloride (Taiyo Vinyl Corporation: TH-2800) having an average degree of polymerization of 2,800 was used.
Composition for Forming a Skin Layer
  Polyvinyl chloride resin (average degree of polymerization 2,800) 100 parts by mass
  Silicone-acrylic copolymer 3 parts by mass
  [Copolymerization ratio of siloxane structural unit:structural unit derived from acrylic monomer=within the range of 70:30 to 75:25]
  Plasticizer (dialkyl phthalate) 85 parts by mass
  Stabilizer (Ba—Zn-based composite stabilizer) 2 parts by mass
  Filler (calcium bicarbonate) 20 parts by mass
  Colorant (Pigment: NIKKO BICS Co., Ltd.: GB-91) 5 parts by mass
Composition for Forming a Foamed Resin Layer
  Polyvinyl chloride resin (Taiyo Vinyl Corporation: TH-1300: average degree of polymerization of 1,300) 100 parts by mass
  Foaming agent (ADCA) 6 parts by mass
  Plasticizer (dialkyl phthalate) 75 parts by mass
  Stabilizer (Ba—Zn-based composite stabilizer) 4 parts by mass
  Filler (calcium bicarbonate) 15 parts by mass
  Colorant (Pigment: NIKKO BICS Co., Ltd.: GB-91) 2 parts by mass In a calender device, each of the above compositions is used to form a laminated body in which a skin layer and a layer of the composition for forming a foamed resin layer are laminated. The thickness of the skin layer in the laminated body was 250 µm, and the thickness of the layer of the composition for forming a foamed resin layer (before foaming) was 500 µm.

Approximately 15 g/m² of adhesive (urethane emulsion adhesive) was applied to the surface of the obtained laminated body on the side of the composition for forming a foamed resin layer, and the base cloth was bonded.

Knitted fabric with improved stockinette stitch (fiber: polyester, thickness: 300 denier, mass per unit area: 155 g/m², thickness: 0.55 mm) was used as the base cloth.

Then, in order to improve the tactile sensation, a composition for forming a surface treatment layer of the following formulation was applied by gravure printing to the surface of the skin layer of the laminated body bonded to the base cloth, and dried to form a surface treatment layer having a thickness of 2 µm.
Composition for Forming a Surface Treatment Layer
  Polyurethane resin composition 100 parts by mass
  Solvent (methyl ethyl ketone: MEK) 900 parts by mass After forming the surface treatment layer, the obtained laminated body was passed through a heating furnace under temperature conditions of 190° C. to 230° C. to cause the foaming agent to foam, and a foamed resin layer containing air bubbles was formed.

Embossing processing was performed by pressing the embossing roller engraved with a shape of a grain pattern against the surface of the surface treatment layer side of the laminated body on which the foamed resin layer is formed while heating the surface of the embossing roller at 130° C., and a synthetic skin resin material, formed with a grain pattern on the surface thereof, of Example 1 having the configuration shown in FIG. 2 was obtained.

Example 2

The skin material of Example 2 was obtained in the same manner as Example 1 except that the content of the silicone-acrylic copolymer with respect to 100 parts by mass of the vinyl chloride resin having a degree of polymerization of 2,800 used in Example 1 was replaced with the amount shown in Table 1 (10 parts by mass).

Example 3

The skin material of Example 3 was obtained in the same manner as Example 1 except that a vinyl chloride resin having a degree of polymerization of 1,700 (Taiyo Vinyl Corporation: TH-1700) was used instead of the vinyl chloride resin having a degree of polymerization of 2,800 used in Example 1, and the content of the silicone-acrylic copolymer was replaced with the amount shown in Table 1 (10 parts by mass).

Example 4

The skin material of Example 4 was obtained in the same manner as Example 1 except that the content of the silicone-acrylic copolymer with respect to 100 parts by mass of the vinyl chloride resin having a degree of polymerization of 2,800 used in Example 1 was replaced with the amount shown in Table 1 (20 parts by mass).

Comparative Example 1

A skin material of Comparative Example 1 was obtained in the same manner as in Example 1 except that a vinyl chloride resin having a degree of polymerization of 1,000 was used instead of the vinyl chloride resin having a degree of polymerization of 2,800 used in Example 1.

Comparative Example 2

The skin material of Comparative Example 2 was obtained in the same manner as in Example 1 except, although the vinyl chloride resin having a degree of polymerization of 2,800 used in Example 1 was used, a silicone-acrylic copolymer was not included.

Comparative Example 3

The skin material of Comparative Example 3 was obtained in the same manner as in Example 1 except, although the vinyl chloride resin having a degree of polymerization of 2,800 used in Example 1 was used, the content of the silicone-acrylic copolymer with respect to 100 parts by mass of the vinyl chloride resin was made to be 2 parts by mass.

Comparative Example 4

An adhesive layer, a foamed resin layer, and a skin layer were formed in this order on a base cloth in the same manner as Example 1 except that a vinyl chloride resin having a degree of polymerization of 1,300 was used instead of the vinyl chloride resin having a degree of polymerization of 2,800 used in Example 1, and a silicone-acrylic copolymer was not included. Further, a cross-linked polyurethane wear resistant layer, which is a layer that imparts wear resistance to the surface of the skin layer, was formed so as to have a film thickness of 8 μm, a surface treatment layer was further formed to have a thickness of 2 μm on the wear resistant layer, and the skin material of Comparative Example 4 was obtained.

Evaluation of Synthetic Resin Skin Material

Each of the obtained synthetic resin skin materials of the Examples and the Comparative Examples was evaluated according to the following criteria. The results are shown in Table 1 below.

—Wear Resistance: Flat Surface Wear Test—

The test was carried out with reference to the flat surface wear tester (Method B) of the cloth material for JASO M 403/88/sheet skin.

As indicated below, the test conditions were stricter than the conditions of the JASO method.

| Test Conditions | | |
|---|---|---|
| | Standard conditions in the JASO method | Conditions for this test |
| Pressing load: | 9.81N | 19.6N |
| Number of tests: | 10,000 times | 40,000 times |

After the flat surface wear test, the central part of the synthetic resin skin material test sample was visually observed and evaluated according to the following judgment criteria.

Judgment Criteria

The judgment criteria are as indicated below. Of the following evaluation results, classification 5 to classification 3 are levels at which there are no practical problems.

| Classification | Judgment Criteria |
|---|---|
| 5 | The grain pattern formed on the skin layer does not disappear |
| 4 | Part of the grain pattern formed on the skin layer disappears, but the foamed resin layer located at the layer under the skin layer is not exposed |
| 3 | The grain pattern formed on the skin layer disappears, but the foamed resin layer located at the layer under the skin layer is not exposed. |
| 2 | The grain pattern of the skin layer disappears, and part of the foamed resin layer located at the layer under the skin layer is exposed. |
| 1 | At less than the number of tests, the grain pattern of the skin layer disappears, and the entire foamed resin layer located at the layer under the skin layer is exposed. |

—Appearance Evaluation—

The obtained synthetic resin skin material test sample was visually observed, and the presence or absence of white blur on the surface of the skin material and the size of the white blur occurrence region were evaluated according to the following criteria. In the following criteria, "wide region of the surface" indicates a "region of 50% or more of the entire region" of the surface to be observed in the synthetic resin skin material.

Judgment Criteria

The judgment criteria are as indicated below. Of the following evaluation results, classification 5 and classification 4 are levels at which there are no practical problems.

| Classification | Judgment Criteria |
|---|---|
| 5 | White blur is not recognized at all |
| 4 | White blur is recognized to a minor extent in a region of part of the surface |
| 3 | White blur is clearly recognized in a region of part of the surface |
| 2 | White blur is clearly recognized over a wide region of the surface |
| 1 | Significant white blur over a wide region of the surface |

—Comprehensive Evaluation—

S Both wear resistance and appearance evaluation are classification 4 or higher

A Wear resistance evaluation is classification 3 or higher and appearance evaluation is classification 4 or higher, or appearance evaluation is classification 3 or higher and wear resistance evaluation is classification 4 or higher B At least one of wear resistance or appearance evaluation is classification 2 or lower

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Skin Layer Formulation | Degree of Polymerization of Vinyl Chloride Resin | 2,800 | 2,800 | 1,700 | 2,800 | 1,000 | 2,800 | 2,800 | 1,30 |
|  | Added Amount (Parts by Mass) of Silicon-acrylic Copolymer | 3 | 10 | 10 | 20 | 3 | 0 | 2 | 0 |
| Other | Cross-linked Polyurethane Wear Resistant layer | no | no | no | no | no | no | no | yes |
| Evaluation Results | Wear Resistance | 3 | 4 | 3 | 4 | 2 | 1 | 2 | 4 |
|  | Appearance | 5 | 5 | 5 | 5 | 5 | 5 | 5 | 2 |
|  | Comprehensive Evaluation | A | S | A | S | B | B | B | B |

From the results in Table 1, the synthetic resin skin materials of Example 1 to Example 4 show a level of wear resistance that does not cause any problems in practical use even in the wear resistance test under strict conditions, and white blur was not recognized in the appearance evaluation. From this, it can be understood that the synthetic resin skin materials of the Examples have both wear resistance and good appearance, and can be suitably used for a molded body having complicated irregularities. Further, although the synthetic resin skin materials of Example 1 to Example 4 have a surface treatment layer, since the surface treatment layer is a thin layer, the occurrence of white blur is not recognized, and the appearance of the skin layer is not impaired, a high degree of freedom in design can be expected.

On the other hand, even if the silicone-acrylic copolymer was included, sufficient wear resistance could not be obtained in Comparative Example 1 in which the degree of polymerization of the vinyl chloride resin was low. Even if a vinyl chloride resin having a higher degree of polymerization was used, sufficient wear resistance could not be obtained in Comparative Example 2 and Comparative Example 3 in which the silicone-acrylic copolymer was not included or the content thereof was low. In Comparative Example 4 in which a cross-linked polyurethane wear resistant layer having a cross-linked structure and a thickness of 8 μm was formed for the purpose of improving wear resistance, although the wear resistance was improved, white blur occurred due to the wear resistant layer, and the appearance was at a practically problematic level.

EXPLANATION OF REFERENCE NUMERALS 10, 22 synthetic resin skin material
14 base cloth
12 vinyl chloride resin skin layer (skin layer)
16 surface treatment layer
18 foamed resin layer
20 adhesive layer
30 conventional synthetic resin skin material
32 skin layer of a conventional synthetic resin skin material The disclosure of Japanese Patent Application 2019-005477 filed on Jan. 16, 2019, is incorporated herein by reference.

All documents, patent applications, and technical standards described in the present disclosure are incorporated by reference in the present disclosure to the same extent as if the individual documents, patent applications, and technical standards were specifically and individually stated to be incorporated by reference.

The invention claimed is:

1. A synthetic resin skin material, comprising:
a base cloth; and
a vinyl chloride resin skin layer that is formed at only one side of the base cloth, and that includes a vinyl chloride resin having a degree of polymerization of 1,600 to 3,000 and includes 7 parts by mass to 20 parts by mass of a silicon-acrylic copolymer with respect to 100 parts by mass of the vinyl chloride resin,
wherein the vinyl chloride resin skin layer is not provided with a surface treatment layer at an opposite side from a base cloth side, or is provided with a surface treatment layer having a thickness of 1 to 3 μm at the opposite side from a base cloth side,
the base cloth and the vinyl chloride resin skin layer are layered with at least one adhesive layer therebetween, and
the vinyl chloride resin skin layer has a thickness of from 170 μm to 650 μm.

2. The synthetic resin skin material according to claim 1, further comprising a foamed resin layer between the base cloth and the vinyl chloride resin skin layer.

3. The synthetic resin skin material according to claim 1, further comprising a foamed resin layer, the at least one adhesive layer and the foamed resin layer disposed in this order from a base cloth side, between the base cloth and the vinyl chloride resin skin layer.

4. The synthetic resin skin material according to claim 2, wherein the foamed resin layer includes a vinyl chloride resin.

5. A method of manufacturing a synthetic resin skin material, the method comprising:
a process of forming a vinyl chloride resin skin layer using a composition for forming a vinyl chloride resin skin layer, the composition including a vinyl chloride resin having a degree of polymerization of 1,600 to 3,000 and including 7 parts by mass to 20 parts by mass of a silicon-acrylic copolymer with respect to 100 parts by mass of the vinyl chloride resin; and a process of adhering a base cloth to only one side of the vinyl chloride resin skin layer via an adhesive layer therebetween, wherein the vinyl chloride resin skin layer has a thickness of from 170 μm to 650 μm, and the vinyl chloride resin skin layer is not provided with a surface treatment layer at an opposite side from a base cloth side, or is provided with a surface treatment layer having a thickness of 1 to 3 μm at the opposite side from a base cloth side.

6. The method of manufacturing a synthetic resin skin material according to claim 5, the method further comprising:

a process of forming a layer of a composition for forming a foamed resin layer, the composition including a foaming agent and a resin, at a side of the vinyl chloride resin skin layer to which the base cloth is adhered, to form a laminated body of the vinyl chloride resin skin layer and the layer of the composition for forming a foamed resin layer; and a process of causing the foaming agent in the composition for forming a foamed resin layer to foam by heating to form a foamed resin layer.

7. The method of manufacturing a synthetic resin skin material according to claim 6, wherein the process of adhering a base cloth includes a process of providing the adhesive layer between the layer of the composition for forming a foamed resin layer and the base cloth.

8. The synthetic resin skin material according to claim 1, wherein the vinyl chloride resin skin layer is not provided with a surface treatment layer at the opposite side from a base cloth side.

9. The synthetic resin skin material according to claim 1, wherein the vinyl chloride resin skin layer is not provided with a surface treatment layer at the opposite side from a base cloth side, or is provided with a surface treatment layer, which is an uncrosslinked polyurethane resin layer, at the opposite side from a base cloth side.

10. The synthetic resin skin material according to claim 1, wherein the vinyl chloride resin skin layer is not provided with a surface treatment layer comprising a crosslinked structure at the opposite side from a base cloth side.

11. The method of manufacturing a synthetic resin skin material according to claim 5, wherein the vinyl chloride resin skin layer is not provided with a surface treatment layer at the opposite side from a base cloth side.

12. The method of manufacturing a synthetic resin skin material according to claim 5, wherein the vinyl chloride resin skin layer is not provided with a surface treatment layer at the opposite side from a base cloth side, or is provided with a surface treatment layer, which is an uncrosslinked polyurethane resin layer, at the opposite side from a base cloth side.

13. The method of manufacturing a synthetic resin skin material according to claim 5, wherein the vinyl chloride resin skin layer is not provided with a surface treatment layer comprising a crosslinked structure at the opposite side from a base cloth side.

\* \* \* \* \*